A. A. TIRRILL.
ELECTRICAL REGULATOR.
APPLICATION FILED OCT. 5, 1911.

1,147,571.

Patented July 20, 1915.

WITNESSES:
R. J. Ridge.
Otto J. Schairer.

INVENTOR
Allen A. Tirrill
BY
Wiley E. Carr
ATTORNEY

UNITED STATES PATENT OFFICE.

ALLEN A. TIRRILL, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTRICAL REGULATOR.

1,147,571.  Specification of Letters Patent.  Patented July 20, 1915.

Application filed October 5, 1911. Serial No. 653,011.

*To all whom it may concern:*

Be it known that I, ALLEN A. TIRRILL, a citizen of the United States, and a resident of Pittsburgh, in the county of Allegheny and State of Pennsylvania, have invented a new and useful Improvement in Electrical Regulators, of which the following is a specification.

My invention relates to electrical regulators, and it has for its object to provide a simple and effective regulator of the kind in which the regulation is effected by adjustment of the field excitation of a dynamo-electric machine.

Figure 1:
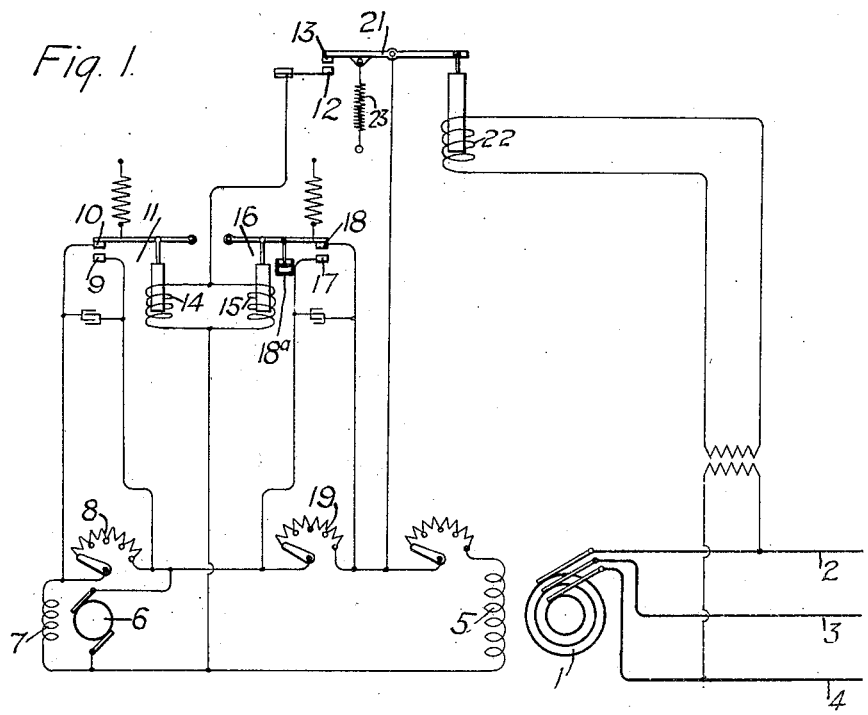
Figure 2:
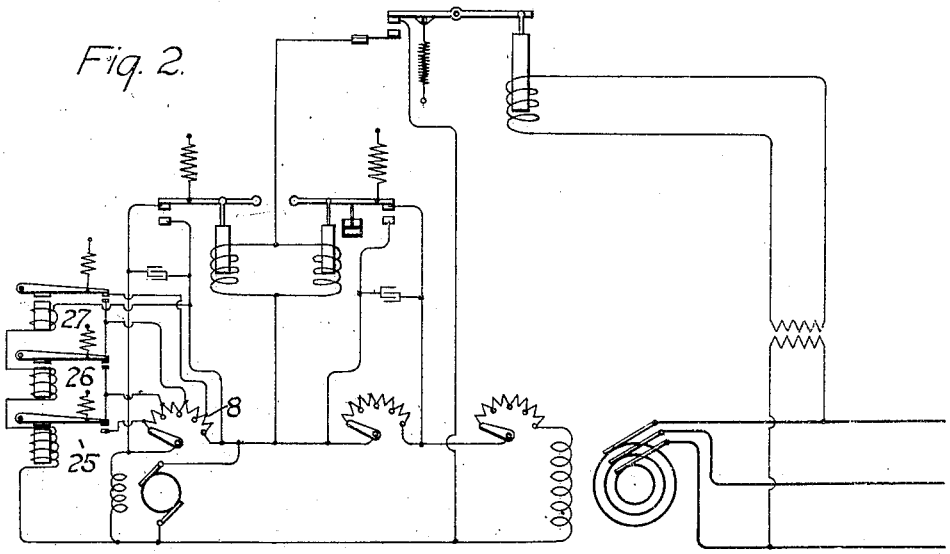

My invention is illustrated in the accompanying drawing, Figure 1 of which is a diagrammatic view of a system of distribution embodying the same, and Fig. 2 of which is a similar view of a system embodying a modification of the invention.

A system in connection with which the present invention may be conveniently employed comprises a generator having its armature 1 connected to a suitable distributing circuit 2—3—4 and its field magnet winding 5 supplied with exciting current from the armature 6 of an exciter. The exciter is provided with a field magnet winding 7 that is preferably shunt excited, though it may be supplied with exciting current from any other suitable source, and in series therewith is a resistor 8 that is adapted to be shunted by means of coöperating contact members 9 and 10 of a relay 11 constituting part of the regulator.

The regulator comprises, further, another pair of coöperating contact members 12 and 13, that control the circuit of an actuating winding 14 of the relay 11, and also the circuit of an actuating winding 15 of another relay 16 having coöperating contact members 17 and 18. The movements of the member 18 are preferably, though not necessarily, somewhat retarded by a dash pot 18ª. The contact terminals 17 and 18 are respectively connected to the terminals of a resistor 19 that is included in the field circuit of the main generator, the resistance of the said resistor being such that, by the establishment and interruption of a shunt circuit thereto by the contact terminals 17 and 18, only a slight percentage of change of the voltage of the main generator will be effected.

In practice, it will preferably be adjusted to effect a change of from one-half of one per cent. to two per cent. in the said voltage. The contact terminal 13 is carried by a lever 21 having an actuating winding 22 that is supplied with energy from the distributing circuit 2—3—4, a spring 23 being employed for causing the member 13 to engage the member 12 when the winding 22 is not sufficiently energized. As here illustrated, the winding 22 receives energy that is proportional to the voltage of the distributing circuit, and, therefore, vibrates the member 13 in accordance with variations of said voltage, but it will be understood that the connections may be so made, if desired, that the position of the member 13 will be varied in accordance with any other selected electrical condition. The contact terminal 12 is preferably resiliently mounted as by being secured to the free end of a plate spring.

In the operation of the regulator, the contact terminal 13 is moved into and out of engagement with the terminal 12, in accordance with variations of the voltage or another selected electrical condition of the distributing circuit, and the relay contacts 10 and 18 are accordingly moved into and out of engagement with the contacts 9 and 17, respectively, so as to alternately establish and interrupt shunt circuits to the resistors 8 and 19. The regulator tends, through the relay contact terminals 9 and 10, to vary the field excitation of the exciter so as to compensate for voltage or other changes in the distributing circuit. However, because of the inductances of the exciter and main generator field circuits, the changes of the voltage of the main generator would not occur with sufficient promptness if it were not for the provision of the resistor 19 and the relay for opening and closing a shunt circuit thereto. By reason of the opening and closing of the shunt circuit to the resistor 19, changes in the voltage of the main generator are not entirely dependent upon changes of the field strength of the exciter, but are effected partially and more promptly by the changes of the resistance and current of the field circuit of the main generator. Since the relay 16 is delayed in its operation by the dash pot 18ª, the changes of the effective resistance of the generator field circuit do not occur as quickly as the changes of the resistance of the exciter field circuit, with the advantageous results that the greater part of the regulation is first effected by the exciter, and the resistance of the generator field circuit is changed just in time to prevent excessive changes in the excitation of the exciter, thereby preventing "hunting". The excitation and voltage of the exciter are also caused to assume values closely approximating those necessary to maintain the generator voltage at its proper value. Wide fluctuations and hunting of the voltage are thereby avoided, and the regulation is prompt and effective.

The system of Fig. 2 is similar to that of Fig. 1 except for the addition of means for automatically adjusting the amount of the resistance of the resistor 8 in accordance with the value of the exciter voltage, the said means comprising a plurality of relay switches 25, 26 and 27 that are closed in succession as the exciter voltage rises, thereby successively shunting portions of the resistor 8. As here shown, the respective relay actuating windings are of gradually increasing numbers of turns to provide for the successive closure of the switches, and are connected in series between the exciter terminals, though any other suitable means may be employed for securing the same result. By the use of these relays, the fluctuations of voltage during the operation of the regulator are reduced, since at the higher field excitations, where the fluctuations are otherwise most noticeable, the amount of resistance in the exciter field circuit, which resistance is periodically shunted, is lessened.

I claim as my invention:

1. The combination with an electrical circuit, a dynamo-electric machine associated therewith, an exciter for the dynamo-electric machine, and resistors in circuit with the field magnet windings respectively of the dynamo-electric machine and of the exciter, of a regulator for the dynamo-electric machine comprising means responsive in operation to variations of an electrical condition of said circuit, and means controlled by the aforesaid means for shunting the said resistors.

2. The combination with an electrical circuit, a dynamo-electric machine associated therewith, and an exciter for the dynamo-electric machine, of a regulator for the dynamo-electric machine comprising means responsive in operation to variations of an electrical condition of said circuit for governing the resistances of the field circuits of both the exciter and dynamo-electric machine, the means for governing the resistance of the field circuit of the dynamo-electric machine being retarded in its operation.

3. The combination with an electrical circuit, a dynamo-electric machine associated therewith, an exciter for the dynamo-electric machine, and resistors in circuit respectively with the field magnet windings of the dynamo-electric machine and the exciter, of a regulator for the dynamo-electric machine comprising coöperating contact members actuated in response to variations of an electrical condition of said circuit, and relay mechanism controlled thereby for governing the effectiveness of the said resistors.

4. The combination with an electrical circuit, a dynamo-electric machine associated therewith, an exciter for the dynamo-electric machine, and resistors in circuit respectively with the field magnet windings of the dynamo-electric machine and the exciter, of a regulator for the dynamo-electric machine comprising coöperating contact members actuated in response to variations of an electrical condition of said circuit, and relay devices controlled thereby respectively for governing the effectiveness of the said resistors, one of said devices being retarded in its operation.

5. The combination with an electrical circuit, a dynamo-electric machine associated therewith, an exciter for the dynamo-electric machine, and resistors in circuit respectively with the field magnet windings of the dynamo-electric machine and the exciter, the resistance of the resistor in the field circuit of the dynamo-electric machine being but a small portion of the total resistance of the said circuit, of a regulator for the dynamo-electric machine comprising means responsive in operation to variations of an electrical condition of said circuit for governing the effectiveness of the said resistors.

6. The combination with an electrical circuit, a dynamo-electric machine, an exciter for the dynamo-electric machine, and resistors in circuit respectively with the field magnet windings of the dynamo-electric machine and the exciter, of a regulator for the dynamo-electric machine comprising means responsive in operation to variations of an electrical condition of said circuit for controlling the effectiveness of the said resistors.

7. The combination with an electrical circuit, a dynamo-electric machine associated therewith, and an exciter for the dynamo-electric machine, of means for adjusting the field excitation of the exciter in accordance with variations of an electrical condition of said circuit, and means for separately adjusting the said field excitation in accordance with variations of the exciter voltage.

8. The combination with an electrical circuit, a dynamo-electric machine associated therewith, and an exciter for the dynamo-electric machine, of a resistor in the exciter field circuit, means for establishing and interrupting a shunt circuit to the said resistor in accordance with variations of an electrical condition of said circuit, and means for separately adjusting the value of said resistor in accordance with variations of the exciter voltage.

In testimony whereof, I have hereunto subscribed my name this 3rd day of October, 1911.

ALLEN A. TIRRILL.

Witnesses:
OTTO S. SCHAIRER,
B. B. HINES.